US012628118B2

(12) United States Patent
Swaminathan et al.

(10) Patent No.: US 12,628,118 B2
(45) Date of Patent: May 12, 2026

(54) EFFICIENT METHOD AND APPARATUS FOR GEO-AWARE PAGING ANALYTICS

(71) Applicant: Nokia Technologies Oy, Espoo (FI)

(72) Inventors: Sivaramakrishnan Swaminathan, Bangalore (IN); Konstantinos Samdanis, Munich (DE)

(73) Assignee: Nokia Technologies Oy, Espoo (FI)

( * ) Notice: Subject to any disclaimer, the term of this patent is extended or adjusted under 35 U.S.C. 154(b) by 449 days.

(21) Appl. No.: 18/308,311

(22) Filed: Apr. 27, 2023

(65) Prior Publication Data

US 2024/0129892 A1 Apr. 18, 2024

(30) Foreign Application Priority Data

Apr. 29, 2022 (IN) .............................. 202211025215

(51) Int. Cl.
*H04W 64/00* (2009.01)
*H04W 68/02* (2009.01)
(52) U.S. Cl.
CPC ......... *H04W 64/006* (2013.01); *H04W 68/02* (2013.01)
(58) Field of Classification Search
CPC ... H04W 64/006; H04W 68/02; H04W 24/08; H04W 24/04; H04W 8/02; H04W 68/00; H04W 4/029; H04W 64/00; H04W 4/02; H04W 52/0245; H04W 76/10; H04W 4/021; H04W 84/042; H04W 88/16; H04W 92/02; H04W 12/63; H04W 16/18; H04W 24/10; H04W 28/0289; H04W 4/025; H04W 4/08; H04W 48/04; H04W 64/003;

(Continued)

(56) References Cited

U.S. PATENT DOCUMENTS 5,313,197 A * 5/1994 Barr .................... H04W 88/185
340/7.58
6,745,039 B1 * 6/2004 Di Lalla ............... H04W 68/04
455/456.2

(Continued)

FOREIGN PATENT DOCUMENTS

WO 2016/190963 A1 12/2016
WO 2021/167423 A1 8/2021

OTHER PUBLICATIONS

Extended European Search Report received for corresponding European Patent Application No. 23170260.6, dated Aug. 4, 2023, 14 pages.

(Continued)

*Primary Examiner* — Nimesh Patel
(74) *Attorney, Agent, or Firm* — Nokia Technologies Oy

(57) ABSTRACT

The disclosure relates to an apparatus comprising at least one processor and at least one memory including computer code for one or more programs, the at least one memory and the computer code configured, with the at least one processor, to cause the apparatus at least to: receive (600), from an analytics consumer, a request to produce paging analytics for a network region of interest, wherein producing the paging analytics include creating a list of one or more geographical areas within the network region of interest where a group of user equipment experience a paging issue; produce (602) paging analytics for the network region of interest; and send (604), to the analytics consumer, results of the paging analytics.

14 Claims, 8 Drawing Sheets

600 Analytics producer may receive, from an analytics consumer, a request to produce paging analytics for a network region of interest, wherein producing the paging analytics include creating a list of one or more geographical areas within the network region of interest where a group of user equipment experience a paging issue

602 Analytics producer may produce paging analytics for the network region of interest

604 Analytics producer may send, to the analytics consumer, results of the paging analytics

(58) Field of Classification Search

CPC ... H04W 68/025; H04W 68/08; H04W 72/12; H04W 12/64; H04W 36/322; H04W 36/30; H04W 36/144; H04W 36/13; H04W 28/18; H04W 40/20; H04W 40/246; H04W 48/06; H04W 72/04; H04W 84/00; H04W 88/185; H04W 88/18; H04W 88/10; H04W 88/085; Y02D 30/70; G06F 30/13; G06F 18/23; G06F 16/9537; G06F 16/9535; H04L 12/189; H04L 41/06; H04L 65/103; H04L 65/104; H04L 9/40; H04L 1/20; H04L 41/12; H04L 43/0823; H04L 43/0847; H04L 43/0852; H04L 43/0864; H04L 43/087; H04L 63/0272; H04L 63/1408; H04M 15/8033; H04M 3/42229; H04M 2215/2026; H04M 2215/32; H04M 2215/7435; H04M 2207/18; H04M 2207/20; H04M 11/022; H04M 15/55; H04M 15/56; H04M 15/58; H04M 2215/0188; H04M 2215/202; H04M 2215/2046; H04M 3/42348

See application file for complete search history.

(56) References Cited

U.S. PATENT DOCUMENTS

| | | | | |
|---|---|---|---|---|
| 2010/0279697 A1* | 11/2010 | Yang | ..................... | H04W 24/08 |
| | | | | 455/446 |
| 2014/0302880 A1* | 10/2014 | Godin | ................... | H04W 68/02 |
| | | | | 455/458 |
| 2022/0368617 A1* | 11/2022 | Xin | ......................... | H04L 41/14 |
| 2023/0091815 A1* | 3/2023 | Gautam | ................ | H04W 24/10 |
| | | | | 455/458 |

OTHER PUBLICATIONS

"3rd Generation Partnership Project; Technical Specification Group Services and System Aspects; Management and orchestration; Management Data Analytics (MDA) (Release 17)", 3GPP TS 28.104, V1.1.0, Apr. 2022, pp. 1-70.

"Update the paging use case description to indicate the geographical areabased and group of users based analytics", 3GPP TSG SA WG5 Meeting 143-e, S5-223350, Nokia, May 9-17, 2022, 2 pages.

"3rd Generation Partnership Project; Technical Specification Group Services and System Aspects; Management and orchestration; Management Data Analytics (MDA) (Release 17)", 3GPP TS 28.104, V2.0.0, Jun. 2022, pp. 1-88.

"3rd Generation Partnership Project; Technical Specification Group Services and System Aspects; Management and orchestration; Management Data Analytics (MDA) (Release 17)", 3GPP TS 28.104, V1.0.0, Mar. 2022, 55 pages.

"3rd Generation Partnership Project; Technical Specification Group Services and System Aspects; Management and orchestration; 5G performance measurements (Release 17)", 3GPP TS 28.552, V17. 6.0, Mar. 2022, pp. 1-307.

"3rd Generation Partnership Project; Technical Specification Group Services and System Aspects; Telecommunication management; Subscriber and equipment trace; Trace data definition and management (Release 17)", 3GPP TS 32.423, V17.3.0, Dec. 2021, pp. 1-109.

"3rd Generation Partnership Project; Technical Specification Group Radio Access Network; NG Radio Access Network (NG-RAN); Stage 2 functional specification of User Equipment (UE) positioning in NG-RAN (Release 17)", 3GPP TS 38.305, V17.0.0, Mar. 2022, pp. 1-132.

"3rd Generation Partnership Project; Technical Specification Group Services and System Aspects; Procedures for the 5G System (5GS); Stage 2 (Release 17)", 3GPP TS 23.502, V17.4.0, Mar. 2022, pp. 1-738.

"Introducing the stage 2 solution for paging analytics use case", 3GPP TSG SA WG5 Meeting 143-e, S5-223750, Agenda Item: 6.6.5, Nokia, May 9-17, 2022, 2 pages.

"3rd Generation Partnership Project; Technical Specification Group Services and System Aspects; Telecommunication management; Generic Network Resource Model (NRM) Integration Reference Point (IRP); Information Service (IS) (Release 18)", 3GPP TS 28.622, V18.1.0, Jan. 2023, pp. 1-92.

"Rel-18 CR TS 28.622 Adding a new data type to represent GeoArea via convex polygon—Stage 2", 3GPP TSG-SA5 Meeting #146, S5-226831, Nokia, Nov. 14-18, 2022, 28 pages.

* cited by examiner

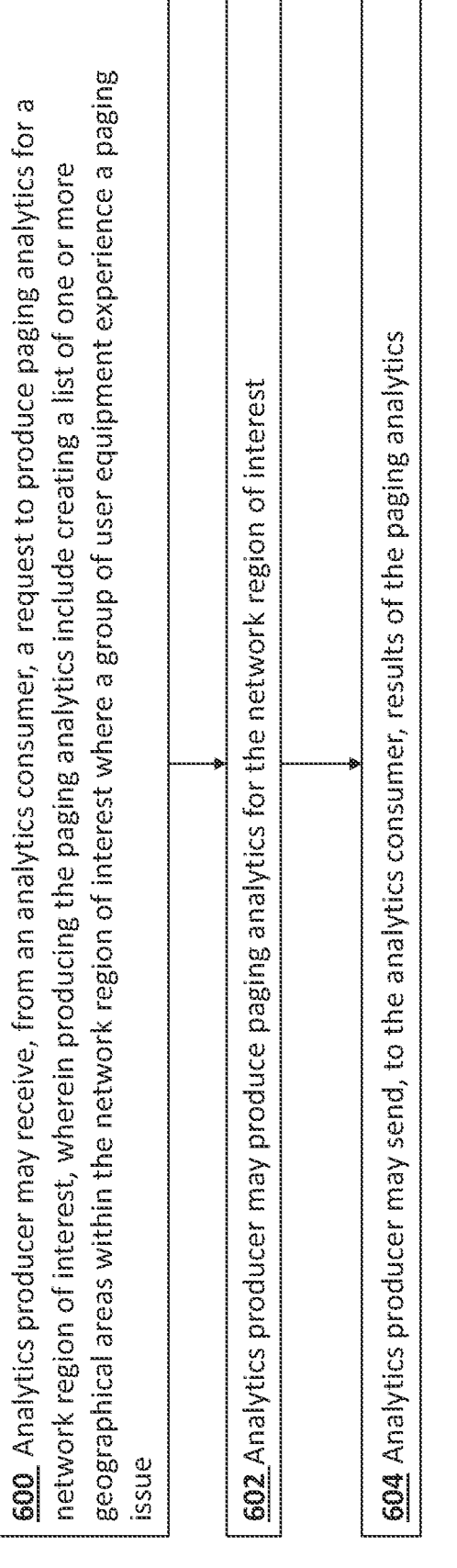

600 Analytics producer may receive, from an analytics consumer, a request to produce paging analytics for a network region of interest, wherein producing the paging analytics include creating a list of one or more geographical areas within the network region of interest where a group of user equipment experience a paging issue 602 Analytics producer may produce paging analytics for the network region of interest 604 Analytics producer may send, to the analytics consumer, results of the paging analytics

Fig 6

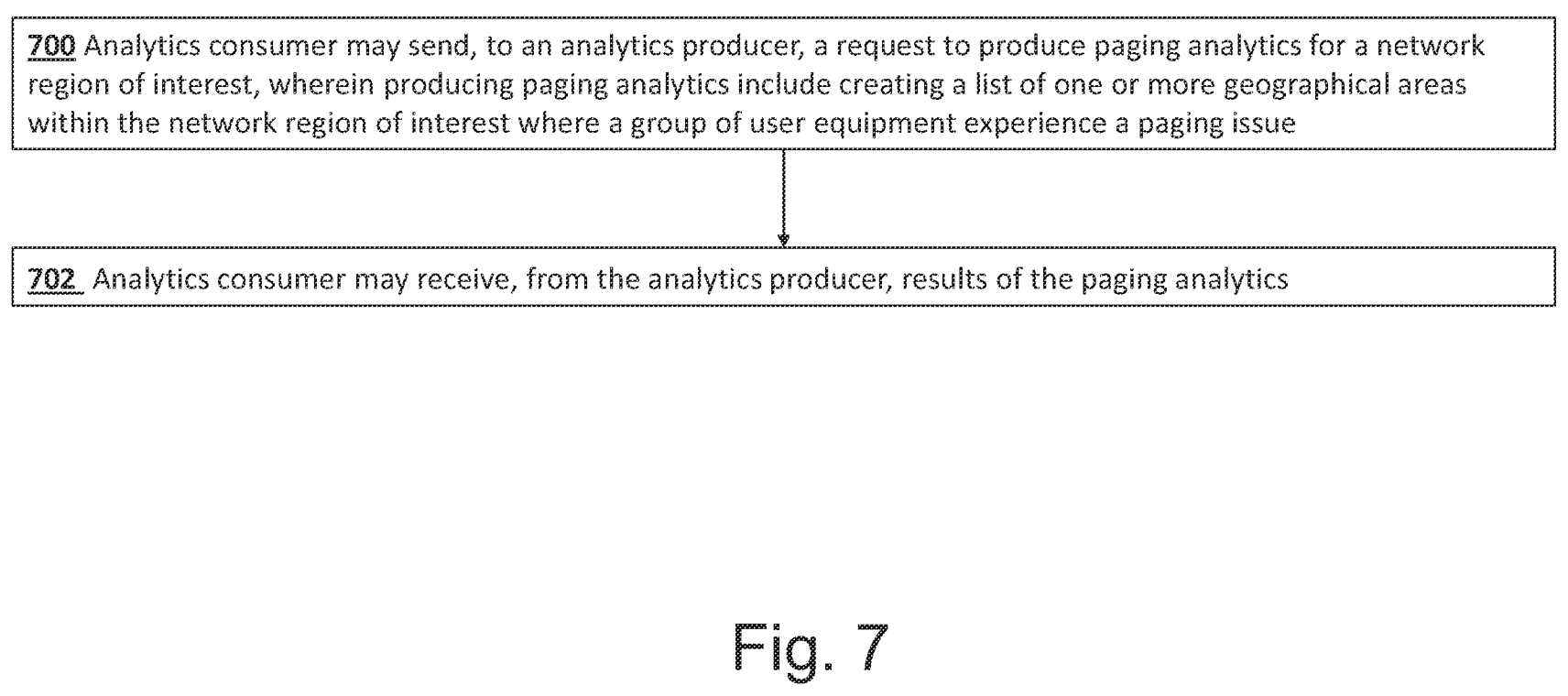

700 Analytics consumer may send, to an analytics producer, a request to produce paging analytics for a network region of interest, wherein producing paging analytics include creating a list of one or more geographical areas within the network region of interest where a group of user equipment experience a paging issue 702 Analytics consumer may receive, from the analytics producer, results of the paging analytics

Fig. 7

EFFICIENT METHOD AND APPARATUS FOR GEO-AWARE PAGING ANALYTICS

RELATED APPLICATIONS

This patent application claims the benefit of priority of Indian Provisional Patent Application No. 202211025215, filed Apr. 29, 2022, which is hereby incorporated by reference as if reproduced in its entirety.

TECHNICAL FIELD

The present disclosure relates to an apparatus, a method, and a computer program for providing paging analytics for a network region of interest to an analytics consumer.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising means for: receiving, from an analytics consumer, a request to produce paging analytics for a network region of interest, wherein producing the paging analytics include creating a list of one or more geographical areas within the network region of interest where a group of user equipment experience a paging issue; producing paging analytics for the network region of interest; and sending, to the analytics consumer, results of the paging analytics.

A geographical area may be defined by geographical coordinates.

A geographical area may be defined by three dimensional geographical coordinates.

A geographical area may be defined by an order to connect the geographical coordinates.

The apparatus may comprise means for: identifying the group of user equipment based on location information and/or mobility information.

The apparatus may comprise means for: creating a geographical map of the network region of interest based on the list of one or more geographical areas within the network region of interest where the group of user equipment experience a paging issue and environmental information of the network region of interest; and sending, to the analytics consumer, results of the paging analytics including the geographical map of the network region of interest.

The apparatus may comprise means for: sending, to the analytics consumer, results of the paging analytics including the list of one or more geographical areas within the network region of interest where the group of user equipment experience a paging issue to allow the analytics consumer to create geographical map of the network region of interest based on the list of one or more geographical areas within the network region of interest where the group of user equipment experience a paging issue and environmental information of the network region of interest.

Environmental information of the network region of interest may comprise the presence of one or more buildings, vegetation or mountains.

Environmental information of the network region of interest may comprise the presence of one or more propagation obstacles.

Producing paging analytics may include identifying a time when a subgroup of user equipment return to a geographical area where the subgroup of user equipment no longer experience a paging issue.

The apparatus may comprise means for: identifying the subgroup of user equipment based on time schedule information.

The time when a subgroup of user equipment return to a geographical area where the subgroup of user equipment no longer experience a paging issue may be identified based on the time schedule information.

The apparatus may comprise means for: sending, to a management service or a data collection entity, a request to receive data to produce paging analytics for the network region of interest; receiving, from the management service or the data collection entity, data to produce paging analytics for the network region of interest; and using the data to produce paging analytics for the network region of interest.

The data may comprise cellular network data and/or non-cellular network data.

Cellular network data may comprise paging information and/or location information.

Non-cellular network data may comprise a road map of the region of interest and/or camera images of places in the region of interest.

According to an aspect there is provided an apparatus comprising at least one processor and at least one memory including computer code for one or more programs, the at least one memory and the computer code configured, with the at least one processor, to cause the apparatus at least to: receive, from an analytics consumer, a request to produce paging analytics for a network region of interest, wherein producing the paging analytics include creating a list of one or more geographical areas within the network region of interest where a group of user equipment experience a paging issue; produce paging analytics for the network region of interest; and send, to the analytics consumer, results of the paging analytics.

A geographical area may be defined by geographical coordinates.

A geographical area may be defined by three dimensional geographical coordinates.

A geographical area may be defined by an order to connect the geographical coordinates.

The at least one memory and the computer code may be configured, with the at least one processor, to cause the apparatus at least to: identify the group of user equipment based on location information and/or mobility information.

The at least one memory and the computer code may be configured, with the at least one processor, to cause the apparatus at least to: create a geographical map of the network region of interest based on the list of one or more geographical areas within the network region of interest where the group of user equipment experience a paging issue and environmental information of the network region of interest; and send, to the analytics consumer, results of the paging analytics including the geographical map of the network region of interest.

The at least one memory and the computer code may be configured, with the at least one processor, to cause the apparatus at least to: send, to the analytics consumer, results of the paging analytics including the list of one or more geographical areas within the network region of interest where the group of user equipment experience a paging issue to allow the analytics consumer to create geographical map of the network region of interest based on the list of one or more geographical areas within the network region of interest where the group of user equipment experience a paging issue and environmental information of the network region of interest.

Environmental information of the network region of interest may comprise the presence of one or more buildings, vegetation or mountains.

Environmental information of the network region of interest may comprise the presence of one or more propagation obstacles.

Producing paging analytics may include identifying a time when a subgroup of user equipment return to a geographical area where the subgroup of user equipment no longer experience a paging issue.

The at least one memory and the computer code may be configured, with the at least one processor, to cause the apparatus at least to: identify the subgroup of user equipment based on time schedule information.

The time when a subgroup of user equipment return to a geographical area where the subgroup of user equipment no longer experience a paging issue may be identified based on the time schedule information.

The at least one memory and the computer code may be configured, with the at least one processor, to cause the apparatus at least to: send, to a management service or a data collection entity, a request to receive data to produce paging analytics for the network region of interest; receive, from the management service or the data collection entity, data to produce paging analytics for the network region of interest; and use the data to produce paging analytics for the network region of interest.

The data may comprise cellular network data and/or non-cellular network data.

Cellular network data may comprise paging information and/or location information.

Non-cellular network data may comprise a road map of the region of interest and/or camera images of places in the region of interest.

According to an aspect there is provided an apparatus comprising circuitry configured to: receive, from an analytics consumer, a request to produce paging analytics for a network region of interest, wherein producing the paging analytics include creating a list of one or more geographical areas within the network region of interest where a group of user equipment experience a paging issue; produce paging analytics for the network region of interest; and send, to the analytics consumer, results of the paging analytics.

A geographical area may be defined by geographical coordinates.

A geographical area may be defined by three dimensional geographical coordinates.

A geographical area may be defined by an order to connect the geographical coordinates.

The circuitry may be configured to: identify the group of user equipment based on location information and/or mobility information.

The circuitry may be configured to: create a geographical map of the network region of interest based on the list of one or more geographical areas within the network region of interest where the group of user equipment experience a paging issue and environmental information of the network region of interest; and send, to the analytics consumer, results of the paging analytics including the geographical map of the network region of interest.

The circuitry may be configured to: send, to the analytics consumer, results of the paging analytics including the list of one or more geographical areas within the network region of interest where the group of user equipment experience a paging issue to allow the analytics consumer to create geographical map of the network region of interest based on the list of one or more geographical areas within the network region of interest where the group of user equipment experience a paging issue and environmental information of the network region of interest.

Environmental information of the network region of interest may comprise the presence of one or more buildings, vegetation or mountains.

Environmental information of the network region of interest may comprise the presence of one or more propagation obstacles.

Producing paging analytics may include identifying a time when a subgroup of user equipment return to a geographical area where the subgroup of user equipment no longer experience a paging issue.

The circuitry may be configured to: identify the subgroup of user equipment based on time schedule information.

The time when a subgroup of user equipment return to a geographical area where the subgroup of user equipment no longer experience a paging issue may be identified based on the time schedule information.

The circuitry may be configured to: send, to a management service or a data collection entity, a request to receive data to produce paging analytics for the network region of interest; receive, from the management service or the data collection entity, data to produce paging analytics for the network region of interest; and use the data to produce paging analytics for the network region of interest.

The data may comprise cellular network data and/or non-cellular network data.

Cellular network data may comprise paging information and/or location information.

Non-cellular network data may comprise a road map of the region of interest and/or camera images of places in the region of interest.

According to an aspect there is provided a method comprising: receiving, from an analytics consumer, a request to produce paging analytics for a network region of interest, wherein producing the paging analytics include creating a list of one or more geographical areas within the network region of interest where a group of user equipment experience a paging issue; producing paging analytics for the network region of interest; and sending, to the analytics consumer, results of the paging analytics.

A geographical area may be defined by geographical coordinates.

A geographical area may be defined by three dimensional geographical coordinates.

A geographical area may be defined by an order to connect the geographical coordinates.

The method may comprise: identifying the group of user equipment based on location information and/or mobility information.

The method may comprise: creating a geographical map of the network region of interest based on the list of one or more geographical areas within the network region of interest where the group of user equipment experience a paging issue and environmental information of the network region of interest; and sending, to the analytics consumer, results of the paging analytics including the geographical map of the network region of interest.

The method may comprise: sending, to the analytics consumer, results of the paging analytics including the list of one or more geographical areas within the network region of interest where the group of user equipment experience a paging issue to allow the analytics consumer to create geographical map of the network region of interest based on the list of one or more geographical areas within the network region of interest where the group of user equipment experience a paging issue and environmental information of the network region of interest.

Environmental information of the network region of interest may comprise the presence of one or more buildings, vegetation or mountains.

Environmental information of the network region of interest may comprise the presence of one or more propagation obstacles.

Producing paging analytics may include identifying a time when a subgroup of user equipment return to a geographical area where the subgroup of user equipment no longer experience a paging issue.

The method may comprise: identifying the subgroup of user equipment based on time schedule information.

The time when a subgroup of user equipment return to a geographical area where the subgroup of user equipment no longer experience a paging issue may be identified based on the time schedule information.

The method may comprise: sending, to a management service or a data collection entity, a request to receive data to produce paging analytics for the network region of interest; receiving, from the management service or the data collection entity, data to produce paging analytics for the network region of interest; and using the data to produce paging analytics for the network region of interest.

The data may comprise cellular network data and/or non-cellular network data.

Cellular network data may comprise paging information and/or location information.

Non-cellular network data may comprise a road map of the region of interest and/or camera images of places in the region of interest.

According to an aspect there is provided a computer program comprising computer executable code which when run on at least one processor is configured to: receive, from an analytics consumer, a request to produce paging analytics for a network region of interest, wherein producing the paging analytics include creating a list of one or more geographical areas within the network region of interest where a group of user equipment experience a paging issue; produce paging analytics for the network region of interest; and send, to the analytics consumer, results of the paging analytics.

A geographical area may be defined by geographical coordinates.

A geographical area may be defined by three dimensional geographical coordinates.

A geographical area may be defined by an order to connect the geographical coordinates.

The circuitry may be configured to: identify the group of user equipment based on location information and/or mobility information.

The computer program may comprise computer executable code which when run on at least one processor is configured to: create a geographical map of the network region of interest based on the list of one or more geographical areas within the network region of interest where the group of user equipment experience a paging issue and environmental information of the network region of interest; and send, to the analytics consumer, results of the paging analytics including the geographical map of the network region of interest.

The computer program may comprise computer executable code which when run on at least one processor is configured to: send, to the analytics consumer, results of the paging analytics including the list of one or more geographical areas within the network region of interest where the group of user equipment experience a paging issue to allow the analytics consumer to create geographical map of the network region of interest based on the list of one or more geographical areas within the network region of interest where the group of user equipment experience a paging issue and environmental information of the network region of interest.

Environmental information of the network region of interest may comprise the presence of one or more buildings, vegetation or mountains.

Environmental information of the network region of interest may comprise the presence of one or more propagation obstacles.

Producing paging analytics may include identifying a time when a subgroup of user equipment return to a geographical area where the subgroup of user equipment no longer experience a paging issue.

The computer program may comprise computer executable code which when run on at least one processor is configured to: identify the subgroup of user equipment based on time schedule information.

The time when a subgroup of user equipment return to a geographical area where the subgroup of user equipment no longer experience a paging issue may be identified based on the time schedule information.

The computer program may comprise computer executable code which when run on at least one processor is configured to: send, to a management service or a data collection entity, a request to receive data to produce paging analytics for the network region of interest; receive, from the management service or the data collection entity, data to produce paging analytics for the network region of interest; and use the data to produce paging analytics for the network region of interest.

The data may comprise cellular network data and/or non-cellular network data.

Cellular network data may comprise paging information and/or location information.

Non-cellular network data may comprise a road map of the region of interest and/or camera images of places in the region of interest.

According to an aspect there is provided an apparatus comprising means for: sending, to an analytics producer, a request to produce paging analytics for a network region of interest, wherein producing paging analytics include creating a list of one or more geographical areas within the network region of interest where a group of user equipment experience a paging issue; and receiving, from the analytics producer, results of the paging analytics.

The group of user equipment may be identified based on last location information and/or mobility information prior to experiencing a paging issue.

The apparatus may comprise means for: receiving, from the analytics producer, results of the paging analytics including a geographical map of the network region of interest based on the list of one or more geographical areas within the network region of interest where the group of user equipment experience a paging issue and environmental information of the network region of interest.

The apparatus may comprise means for: receiving, from the analytics producer, results of the paging analytics including the list of one or more geographical areas within the network region of interest where the group of user equipment experience a paging issue; and create a geographical map of the network region of interest based on the list of one or more geographical areas within the network region of interest where the group of user equipment experience a paging issue and environmental information of the network region of interest.

Producing paging analytics may include identifying a time when a subgroup of user equipment return to a geographical area where the subgroup of user equipment no longer experience a paging issue.

The subgroup of user equipment may be identified based on time schedule information.

The time when a subgroup of user equipment return to a geographical area where the subgroup of user equipment no longer experience a paging issue may be identified based on the time schedule information.

The apparatus may comprise means for: obtaining current location information of a user equipment; and using the current location information of the user equipment and the result of the analytics to predict whether the user equipment is likely to experience a paging issue.

According to an aspect there is provided an apparatus comprising at least one processor and at least one memory including computer code for one or more programs, the at least one memory and the computer code configured, with the at least one processor, to cause the apparatus at least to: send, to an analytics producer, a request to produce paging analytics for a network region of interest, wherein producing paging analytics include creating a list of one or more geographical areas within the network region of interest where a group of user equipment experience a paging issue; and receive, from the analytics producer, results of the paging analytics.

The group of user equipment may be identified based on last location information and/or mobility information prior to experiencing a paging issue.

The at least one memory and the computer code may be configured, with the at least one processor, to cause the apparatus at least to: receive, from the analytics producer, results of the paging analytics including a geographical map of the network region of interest based on the list of one or more geographical areas within the network region of interest where the group of user equipment experience a paging issue and environmental information of the network region of interest.

The at least one memory and the computer code may be configured, with the at least one processor, to cause the apparatus at least to: receive, from the analytics producer, results of the paging analytics including the list of one or more geographical areas within the network region of interest where the group of user equipment experience a paging issue; and create a geographical map of the network region of interest based on the list of one or more geographical areas within the network region of interest where the group of user equipment experience a paging issue and environmental information of the network region of interest.

Producing paging analytics may include identifying a time when a subgroup of user equipment return to a geographical area where the subgroup of user equipment no longer experience a paging issue.

The subgroup of user equipment may be identified based on time schedule information.

The time when a subgroup of user equipment return to a geographical area where the subgroup of user equipment no longer experience a paging issue may be identified based on the time schedule information.

The at least one memory and the computer code may be configured, with the at least one processor, to cause the apparatus at least to: obtain current location information of a user equipment; and use the current location information of the user equipment and the result of the analytics to predict whether the user equipment is likely to experience a paging issue.

According to an aspect there is provided an apparatus comprising circuitry configured to: send, to an analytics producer, a request to produce paging analytics for a network region of interest, wherein producing paging analytics include creating a list of one or more geographical areas within the network region of interest where a group of user equipment experience a paging issue; and receive, from the analytics producer, results of the paging analytics.

The group of user equipment may be identified based on last location information and/or mobility information prior to experiencing a paging issue.

The circuitry may be configured to: receive, from the analytics producer, results of the paging analytics including a geographical map of the network region of interest based on the list of one or more geographical areas within the network region of interest where the group of user equipment experience a paging issue and environmental information of the network region of interest.

The circuitry may be configured to: receive, from the analytics producer, results of the paging analytics including the list of one or more geographical areas within the network region of interest where the group of user equipment experience a paging issue; and create a geographical map of the network region of interest based on the list of one or more geographical areas within the network region of interest where the group of user equipment experience a paging issue and environmental information of the network region of interest.

Producing paging analytics may include identifying a time when a subgroup of user equipment return to a geographical area where the subgroup of user equipment no longer experience a paging issue.

The subgroup of user equipment may be identified based on time schedule information.

The time when a subgroup of user equipment return to a geographical area where the subgroup of user equipment no longer experience a paging issue may be identified based on the time schedule information.

The circuitry may be configured to: obtain current location information of a user equipment; and use the current location information of the user equipment and the result of the analytics to predict whether the user equipment is likely to experience a paging issue.

According to an aspect there is provided a method comprising: sending, to an analytics producer, a request to produce paging analytics for a network region of interest, wherein producing paging analytics include creating a list of one or more geographical areas within the network region of interest where a group of user equipment experience a paging issue; and receiving, from the analytics producer, results of the paging analytics.

The group of user equipment may be identified based on last location information and/or mobility information prior to experiencing a paging issue.

The method may comprise: receiving, from the analytics producer, results of the paging analytics including a geographical map of the network region of interest based on the list of one or more geographical areas within the network region of interest where the group of user equipment experience a paging issue and environmental information of the network region of interest.

The method may comprise: receiving, from the analytics producer, results of the paging analytics including the list of one or more geographical areas within the network region of interest where the group of user equipment experience a paging issue; and create a geographical map of the network region of interest based on the list of one or more geographical areas within the network region of interest where the group of user equipment experience a paging issue and environmental information of the network region of interest.

Producing paging analytics may include identifying a time when a subgroup of user equipment return to a geographical area where the subgroup of user equipment no longer experience a paging issue.

The subgroup of user equipment may be identified based on time schedule information.

The time when a subgroup of user equipment return to a geographical area where the subgroup of user equipment no longer experience a paging issue may be identified based on the time schedule information.

The method may comprise: obtaining current location information of a user equipment; and using the current location information of the user equipment and the result of the analytics to predict whether the user equipment is likely to experience a paging issue.

According to an aspect there is provided a computer program comprising computer executable code which when run on at least one processor is configured to: send, to an analytics producer, a request to produce paging analytics for a network region of interest, wherein producing paging analytics include creating a list of one or more geographical areas within the network region of interest where a group of user equipment experience a paging issue; and receive, from the analytics producer, results of the paging analytics.

The group of user equipment may be identified based on last location information and/or mobility information prior to experiencing a paging issue.

The computer program may comprise computer executable code which when run on at least one processor is configured to: receive, from the analytics producer, results of the paging analytics including a geographical map of the network region of interest based on the list of one or more geographical areas within the network region of interest where the group of user equipment experience a paging issue and environmental information of the network region of interest.

The computer program may comprise computer executable code which when run on at least one processor is configured to: receive, from the analytics producer, results of the paging analytics including the list of one or more geographical areas within the network region of interest where the group of user equipment experience a paging issue; and create a geographical map of the network region of interest based on the list of one or more geographical areas within the network region of interest where the group of user equipment experience a paging issue and environmental information of the network region of interest.

Producing paging analytics may include identifying a time when a subgroup of user equipment return to a geographical area where the subgroup of user equipment no longer experience a paging issue.

The subgroup of user equipment may be identified based on time schedule information.

The time when a subgroup of user equipment return to a geographical area where the subgroup of user equipment no longer experience a paging issue may be identified based on the time schedule information.

The computer program may comprise computer executable code which when run on at least one processor is configured to: obtain current location information of a user equipment; and use the current location information of the user equipment and the result of the analytics to predict whether the user equipment is likely to experience a paging issue.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AMF: Access and Mobility Management Function
API: Application Programming Interface
BS: Base Station
CU: Centralized Unit
DL: Downlink
DU: Distributed Unit
eMDAS: Enhanced Management Data Analytics Service
gNB: gNodeB
GSM: Global System for Mobile communication
HSS: Home Subscriber Server
IoT: Internet of Things
LTE: Long Term Evolution
MAC: Medium Access Control
MDA: Management Data Analytics
MDAS: Management Data Analytics Service
MDT: Minimization of Driving Test
MnS: Management Service
MS: Mobile Station MTC: Machine Type Communication
NEF: Network Exposure Function
NF: Network Function
NR: New radio
NRF: Network Repository Function
PDU: Packet Data Unit
PRS: Positioning Reference Signal
RAM: Random Access Memory
(R)AN: (Radio) Access Network
ROM: Read Only Memory
RSRP: Reference Signal Receive Power
SMF: Session Management Function
TR: Technical Report
TRP: Transmission Point
TS: Technical Specification
UE: User Equipment
UMTS: Universal Mobile Telecommunication System
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which:

FIG. 6 shows a signaling diagram of a method for providing paging analytics for a network region of interest to an analytics consumer performed by an analytics producer;

FIG. 7 shows a signaling diagram of a method for providing paging analytics for a network region of interest to an analytics consumer performed by the analytics consumer.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
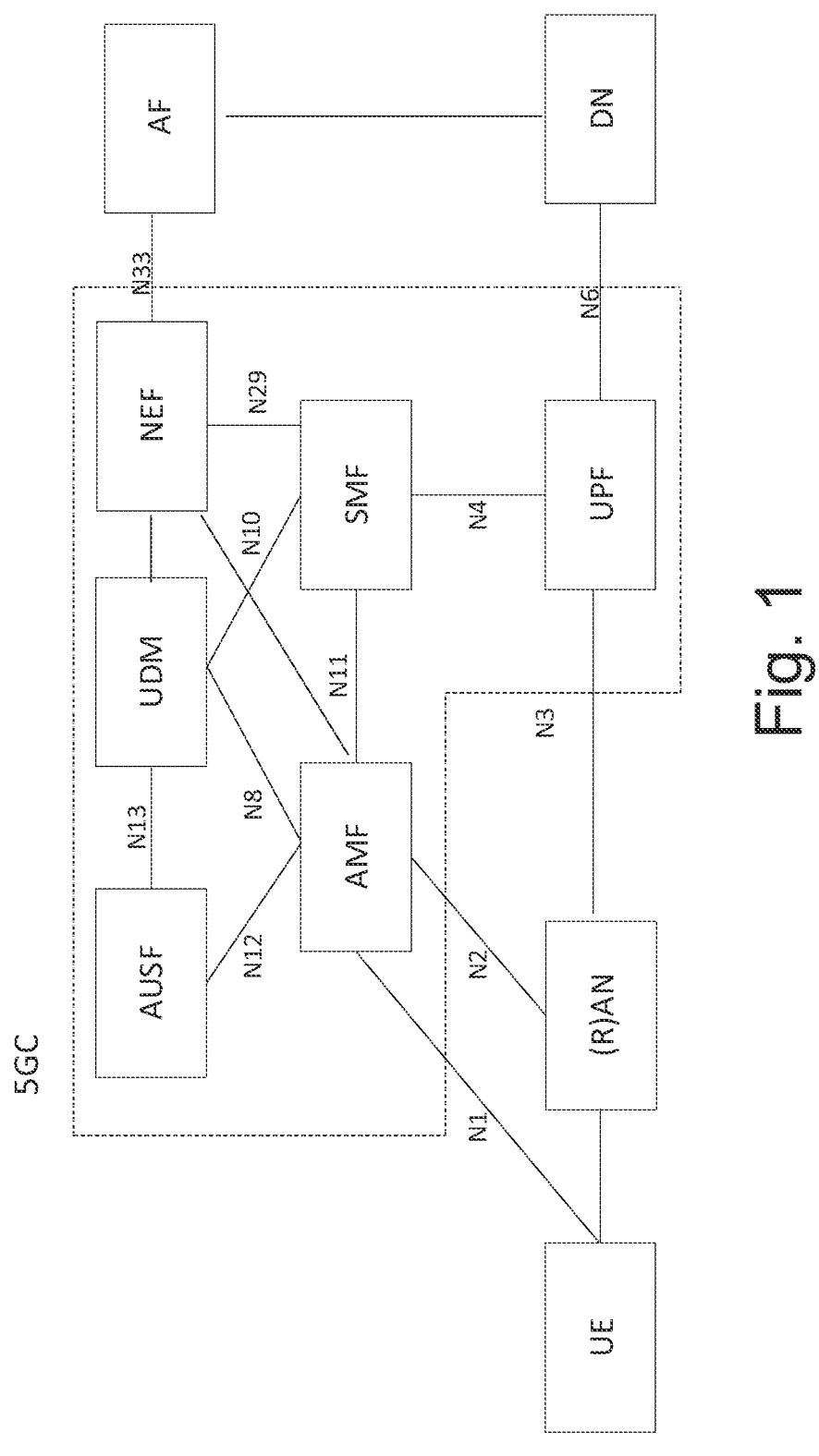
FIG. 1 shows a schematic representation of a 5G system.

FIG. 1 shows a schematic representation of a 5G system (5GS). The 5GS may comprises a user equipment (UE), a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF).

Figure 2:
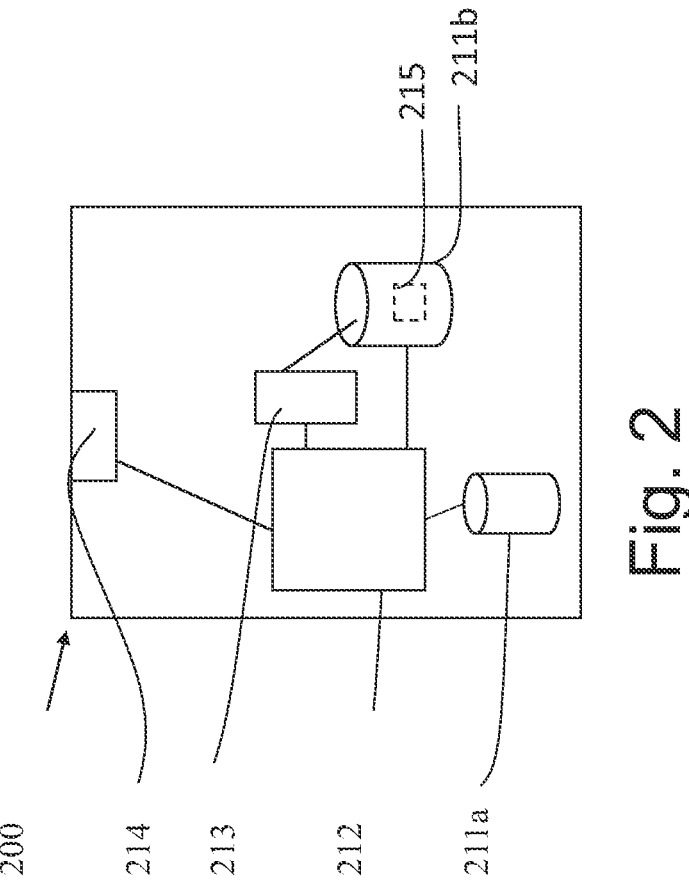
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
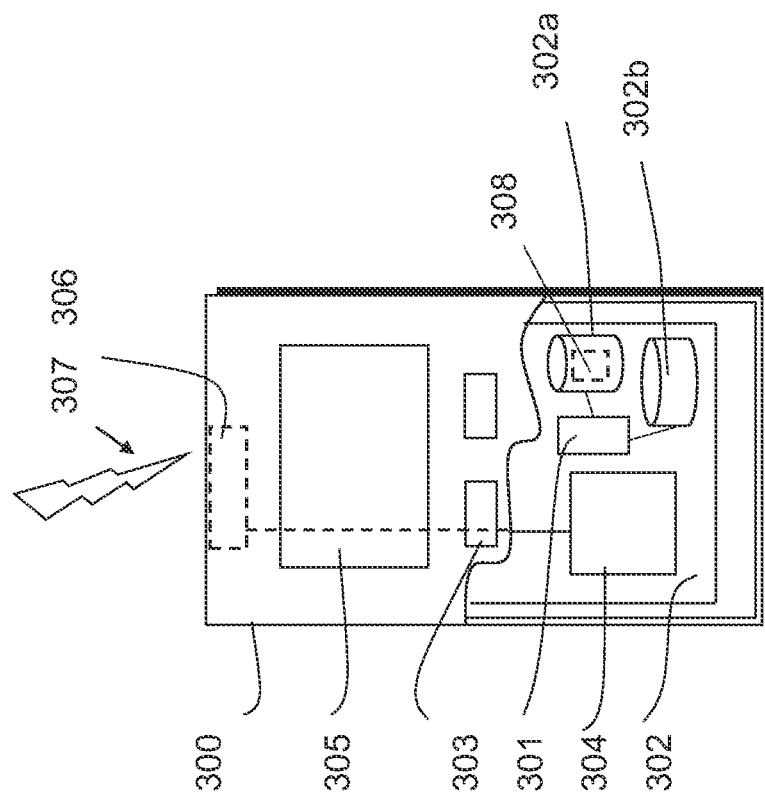
FIG. 3 shows a schematic representation of a user equipment.

FIG. 3 illustrates an example of a UE 300, such as the UE illustrated on FIG. 1. The UE 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The UE 300 may provide, for example, communication of data for carrying communications. The communications may be one or more of voice, electronic mail (email), text message, multimedia, data, machine data and so on.

The UE 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The UE 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

3GPP TS 28.502 describes basic paging procedures in 5GS.

3GPP TS 28.104 (section 7.2.1.3) relates to paging optimization analysis and reads as follows.

7.2.1.3 Paging Optimization Analysis 7.2.1.3.1 Description

This MDA capability deals with enabling various functionalities related to paging optimization.

7.2.1.3.2 Use Case

As per the current procedures, if the UE goes out-of-coverage (OOC) the paging which was initiated by the network Access and Mobility Management Function (AMF) fails. The re-attempts continue to fail until UE comes in the coverage and reacts to the paging attempts. This repetitive paging attempts result in the wastage of network resources. As an example, the use case includes a user or a group of users getting into an area, with no cellular coverage on a regular basis for a considerably long duration, for e.g., the user gets into a shielded room for some testing purpose every day for a defined period. The Network initiated paging for such users will fail until they are back in the area with cellular coverage. This would result in in-efficient network resource usage.

It is desirable to use MDAS (Management data analytic service) to optimize the current paging procedures in 5G networks. MDAS producer provides an analytics output containing the user(s) paging analytics indicating the time window at which the user is OOC on a regular basis at the particular location and hence will not be able to respond on a network-initiated paging. Based on the output MDAS consumer (e.g., AMF, gNB) decides on whether, when and where to initiate or not to initiate the paging procedures, thereby ensuring the efficient paging procedures and optimal network resource utilization, as paging can be initiated only when there are more chances for it to be successful.

7.2.1.3.3 Requirements the network. The pre-agreed time interval may be calculated based on different parameters such as a paging cycle, paging sub frames or other parameters.

It may be important for a UE to successfully read a paging message destined to the UE to allow the network to establish a connection with the UE. If the UE fails to successfully read the paging message destined to the UE, then the network may fail to establish a connection with the UE. Repeated paging issues (i.e. paging failure) may result in network resources being wasted and the network operator losing revenue. Hence it may important for the network and the UE to minimize paging issues.

Management data analytics services (MDAS) may be used to minimize paging issues. Paging analytics may be produced and paging issues may be predicted based on the paging analytics.

3GPP TS 28.104 relates to enhanced management data analytics service (eMDAS). 3GPPTS 28.104 provides a paging solution to avoid paging attempts for UEs that are out of coverage due to coverage holes. A goal may be to avoid overloading the network with unnecessary paging attempts for UEs that are not reachable.

A challenge may be to identify the last location beyond which a UE may be out of coverage and may not be reachable. Another challenge may be to identify a time when a UE may be back in coverage and may be reachable. Management data analytics (MDA) may be used to collect UE location statistics to identify and predict the last location beyond which a UE may be out of coverage and may not be reachable and a time when a UE may be back in coverage and may be reachable.

A typical scenario may be a UE entering a building and leaving at specific times. The UE may be out of coverage and may not be reachable when the UE is inside the building. The UE may be in coverage and may be reachable when the UE is outside the building.

3GPP TS 28.104 proposes that paging analytics be produced per single UE. This proposal is complex and not practical because it tracks an individual UE. Information is

| Requirement label | Description | Related use case(s) |
|---|---|---|
| REQ-PAG_MDA-01 | MDA capability for paging optimization analysis shall be able to provide analytics output describing paging result patterns for a particular user or a group of users. | Paging optimization analysis |
| REQ-PAG_MDA-02 | MDA capability for paging optimization analysis shall be able to provide analytics output describing the paging result patterns based on successful and un-successful paging attempts at a particular time and duration. | Paging optimization analysis |
| REQ-PAG_MDA-03 | MDA capability for paging optimization analysis shall be able to provide analytics output describing the paging result patters to contain the following information: Identification of the user or a group of users. Prediction of the time window during which UE is out-of-coverage every day. Prediction of the last location before UE going out-of-coverage every day. The recommended action which may suggest stopping paging the UE for Daily-OOC-Duration at Daily-OOC-Location. | Paging optimization analysis |

One or more aspects of this disclosure relate to paging. Paging is a functionality in wireless systems that enables a network to reach to a UE in idle mode when the network has information to send to the UE. Paging may initiate a service for the UE in idle mode. The UE in idle mode may not listen to the network continuously to save battery. The UE in idle mode may wake up and check for paging messages from the network at a pre-agreed time interval between the UE and extracted and stored for the individual UE to produce paging analytics for the individual UE. The information is not reused for produce paging analytics for other UEs.

One or more aspects of this disclosure simplify the above proposal by tracking a group of UEs and identifying a pattern of paging issues for a group of UEs. Information may be extracted and stored for the group of UEs and may be reused for other UEs.

A UE may experience a paging issue due to a network issue (e.g. due to coverage issue) rather than due to the UE itself (unless the UE is faulty). This implies that the issue due to a network issue may not only affect the UE but may also affect other UEs in the vicinity of the UE.

One or more aspects of this disclosure propose to configure an analytics producer (MDA MnS producer) or an analytics consumer (MDA MnS consumer) to produce paging analytics (geo-aware paging MDA) and create a geographical map of a network region of interest including a list of geographical areas of the network region of interest where a group of UEs experience a paging issue. The geographical map may be a three dimensional geographical map.

One or more aspects of this disclosure propose to configure an analytics consumer (MDA MnS consumer) to obtain a current location of a UE. The analytics consumer (MDA MnS consumer) may use the current location of the UE and the geographical map to determine whether the UE is likely to experience a paging issue. In this way, a paging procedure may be optimized.

One or more aspects of this disclosure propose to configure an analytics producer (MDA MnS producer) to identify a time when a subgroup of UEs (i.e. cluster of UEs within the group of UEs) return to a geographical area where the subgroup of UEs may no longer experience a paging issue.

One or more aspects of this disclosure propose to configure an analytics consumer (MDA MnS consumer) to use such time to determine whether the UE is likely to experience a paging issue. In this way, a paging procedure may further be optimized.

Figure 4:
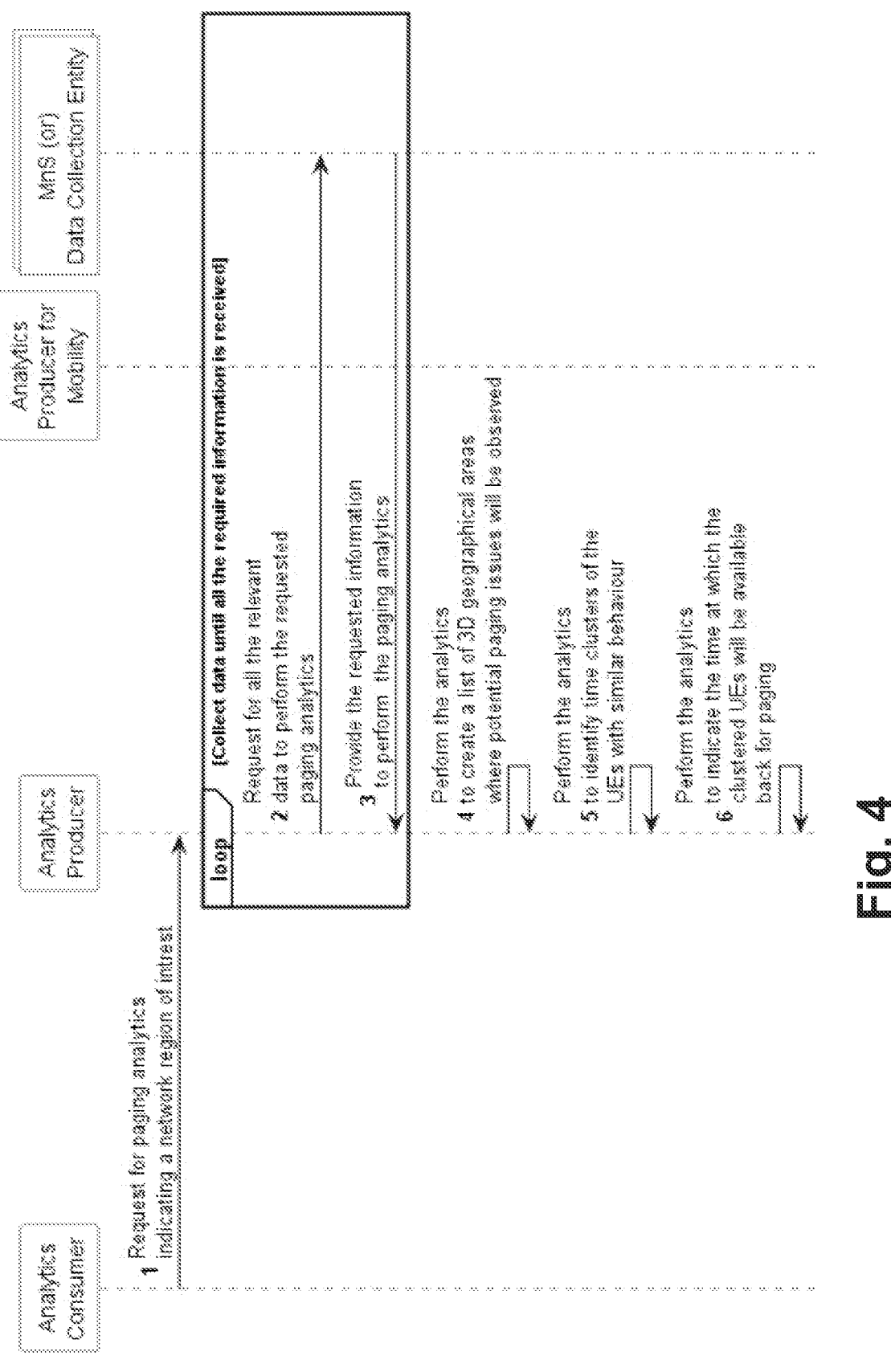
FIGS. 4 and 5 show a signaling diagram of a process for producing paging analytics for a network region of interest.
Figure 5:
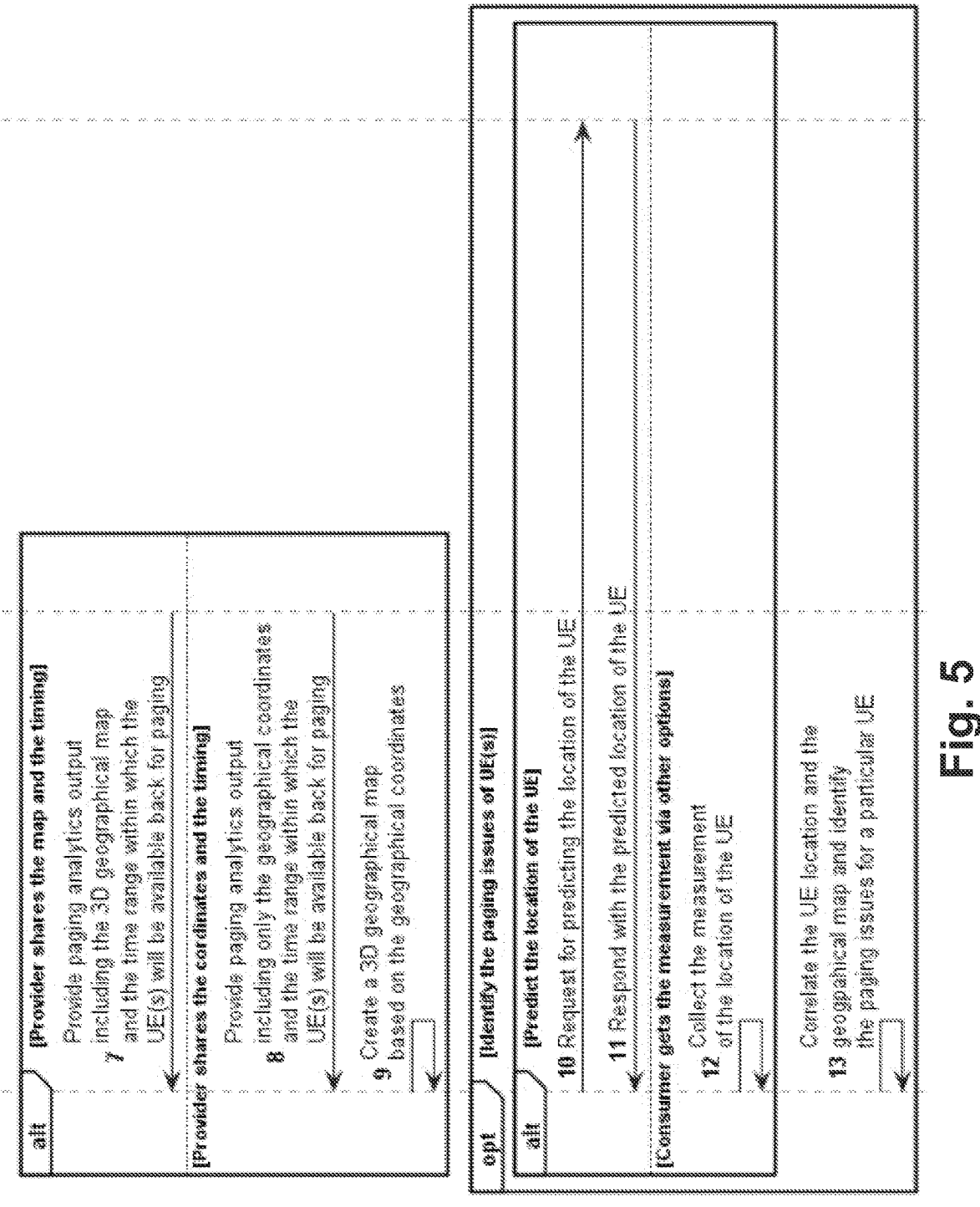

FIGS. 4 and 5 show a signaling diagram of a process for producing paging analytics for a network region of interest. The process captures two embodiments.

In a first embodiment, analytics producer may create a list of one or more geographical areas within the network region of interest where a group of UEs experience a paging issue. The analytics producer may create a geographical map of a network region of interest including the list of one or more geographical areas within the network region of interest where the group of UEs experience a paging issue. The analytics producer may identify a time when a subgroup of UEs (i.e., cluster of UEs within the group of UEs) return to a geographical area where the subgroup of UEs no longer experience a paging issue. The analytics producer may provide the geographical map of a network region of interest to an analytics consumer. The analytics producer may provide the time to the analytics consumer.

In a second embodiment an analytics producer may create a list of one or more geographical areas within the network region of interest where a group of UEs experience a paging issue. The analytics producer may identify a time when a subgroup of UEs return to a geographical area where the subgroup of UEs no longer experience a paging issue. The analytics producer may provide the list of one or more geographical areas within the network region of interest where a group of UEs experience a paging issue to an analytics consumer. The analytics consumer may create a geographical map of a network region of interest including the list of one or more geographical areas within the network region of interest where a group of UEs experience a paging issue. The analytics producer may provide the time to the analytics consumer.

The first and second embodiments are now described in further details.

In step 1, an analytics consumer may send a request to an analytics producer to produce paging analytics for a network region of interest. Producing paging analytics may include creating a list of one or more geographical areas within the network region of interest where a group of UEs experience a paging issue. Producing paging analytics may include identifying a time when a subgroup of UEs (i.e. cluster of UEs within the group of UEs) return to a geographical area where the subgroup of UEs no longer experience a paging issue.

In step 2, the analytics producer may send a request to a MnS or a data collection entity to obtain data to produce the paging analytics. The data may comprise cellular network data (i.e. 3GPP data) and/or non-cellular network data (i.e. non-3GPP data).

Cellular network data may comprise paging performance management information (see 3GPP TS 28.552). The paging performance management information may comprise one or more of the following:

Number of 5G paging procedures initiated (see 3GPP TS 28.552 section 5.2.5.2.1);

Number of successful 5G paging procedures (see 3GPP TS 28.552 section 5.2.5.2.2)

Number of CN Initiated paging records received by a gNB-CU (see 3GPP TS 28.552 section 5.1.1.27.1);

Number of NG-RAN Initiated paging records received by a gNB-CU (see 3GPP TS 28.552 section 5.1.1.27.2)

Number of paging records received by a gNB-DU/NR-CellDU (see 3GPP TS 28.552 section 5.1.1.27.3)

Number of CN Initiated paging records discarded at a gNB-CU (see 3GPP TS 28.552 section 5.1.1.27.4);

Number of NG-RAN Initiated paging records discarded at the gNB-CU (see 3GPP TS 28.552 section 5.1.1.27.5); and Number of paging records discarded at the gNB-DU/NRCellDU (see 3GPP TS 28.552 section 5.1.1.27.6).

Cellular network data may comprise location information (see 3GPP TS 32.423). The location information may comprise one or more of the following:

UE location provided by a trace record for immediate minimization of driving test (MDT) measurement (M1) (Section 4.34.1 TS 32.423); and UE location (including latitude, longitude and altitude) provided by "Trace record for UE location information" (Section 4.34.2 TS 32.423).

Cellular network data may comprise additional or alternative location information (see 3GPP TS 38.305). The location information may comprise the following:

UE location estimated using downlink positioning reference signal reference signal received power (DL-PRS-RSRP) measurements taken at the UE of downlink radio signals from multiple NR transmission points (TRPs), along with knowledge of spatial information of the downlink radio signals and geographical coordinates of the TRPs.

The UE location may contain latitude, longitude and the altitude of the UE.

Cellular network data may comprise MDT information.

Cellular network data may comprise call pattern information.

Cellular network data may comprise tracking area update information.

Cellular network data may comprise last location information prior to a paging issue and/or first location information subsequent to experiencing a paging issue. The last location information prior to a paging issue and/or first location information subsequent to experiencing a paging issue may be used to determine the shape of one or more geographical areas (e.g. building) where the group of UE experience a paging issue. For example, a popular last location prior to experiencing a paging issue and/or first location information subsequent to experiencing a paging issue may indicate an entrance or a passage into a building.

Cellular network data may comprise mobility information. The mobility information may be used to determine the shape of one or more geographical areas (e.g. building) where the group of UE experience a paging issue.

Non-cellular network data may comprise a road map (e.g. city map) of the network region of interest and/or camera images from different places in the network region of interest.

Non-cellular network data may comprise time schedule information (e.g. the user of the UE is a full time worker (i.e. works 8 hours per day) or a part time worker (i.e. works 4 hours per day). Time schedule information may comprise information indicating a starting time and a finishing time of a user.

The cellular network data and/or the non-cellular network data may be used by the analytics producer to identify a group of UEs.

The cellular network data and/or the non-cellular network data may be used by the analytics producer to create a list of one or more geographical areas within the network region of interest where the group of UEs experience a paging issue. A geographical area may be defined by geographical coordinates including latitude, longitude and altitude. A geographical area may be defined by an order to connect the geographical coordinates.

The cellular network data and/or the non-cellular network data may be used by the analytics producer to determine environmental information of the network region of interest. Environmental information of the network region of interest may comprise the presence of one or more buildings, vegetation or mountains. Environmental information of the network region of interest may comprise the presence of one or more propagation obstacles. Environmental information of the network region of interest may be derived from a road map of the network region of interest. Environmental information of the network region of interest may be derived from camera images from different places in the network region of interest.

The cellular network data and/or the non-cellular network data may be used by the analytics producer to create a geographical map of the network region of interest based on the list of one or more geographical areas within the network region of interest where the group of UEs experience a paging issue and the environmental information of the network region of interest. The geographical map of the network region of interest may be a three-dimensional geographical map of the network region of interest.

The cellular network data and/or the non-cellular network data may be used by the analytics producer to identify a subgroup of UEs (i.e. cluster of UEs within the group of UEs).

The cellular network data and/or the non-cellular network data may be used by the analytics producer to identify a time when the subgroup of UEs (i.e. cluster of UEs within the group of UEs) return to a geographical area where the subgroup of UEs no longer experience a paging issue.

In step 3, the analytics producer may receive the data to produce the paging analytics from the MnS or a data collection entity.

It will be understood that step 2 and step 3 may be performed continuously subsequent to the request to produce paging analytics being received by the analytics producer. For example, step 2 and step 3 may be performed periodically.

In step 4, the analytics producer may use the cellular network data and/or the non-cellular network data to identify a group of UEs. The group of UEs may have similar behaviours.

The group of UEs may be identified based on location information (e.g. last location information prior to experiencing a paging issue and/or first location information subsequent to experiencing a paging issue).

In an example, the group of UEs may be identified based on a relative distance between the last locations of the group of UEs prior to experiencing a paging issue.

In another example, the group of UEs may be identified based on an absence of a location where a UE has been paged between the last locations of the group of UEs prior to experiencing a paging issue.

The group of UEs may be identified based on mobility information.

In step 4, the analytics producer may use the cellular network data and/or the non-cellular network data to create a list of one or more geographical areas within the network region of interest where the group of UEs experience a paging issue.

It will be understood that the list of one or more geographical areas within the network region of interest where the group of UEs experience a paging issue may vary over time. Therefore, the list of one or more geographical areas within the network region of interest where the group of UEs experience a paging issue may be updated continuously. For example, the list of one or more geographical areas within the network region of interest where the group of UEs experience a paging issue may be updated periodically.

In step 5, the analytics producer may use the cellular network data and/or the non-cellular network data to identify a subgroup of UEs (i.e. cluster of UEs within the group of UEs). The subgroup of UEs may be identified based on time schedule information.

In step 6, the analytics producer may use the cellular network data and/or the non-cellular network data to identify a time when the subgroup of UEs (i.e. cluster of UEs within the group of UEs) return to a geographical area where the subgroup of UEs no longer experience a paging issue.

It will be understood that the time when the subgroup of UEs return to a geographical area where the subgroup of UEs no longer experience a paging issue may vary over time. The time when the subgroup of UEs return to a geographical area where the subgroup of UEs no longer experience a paging issue may be updated continuously. For example, the time when the subgroup of UEs return to a geographical area where the subgroup of UEs no longer experience a paging issue may be updated periodically.

The time may be identified based on time schedule information.

The time may be identified based on location information (e.g. last location information prior to experiencing a paging issue and/or first location information subsequent to experiencing a paging issue).

The time may be identified based on mobility information.

The time may comprise a single time instance or a plurality of time instances (e.g. a range of time instances (i.e. time window)).

In an example, the time may comprise a range of time instances (i.e. time window) starting thirty minutes before the finishing time of the user and finishing one hour after the finishing time.

Various tactics may be implemented to determine the time when the subgroup of UEs return to a geographical area where the subgroup of UEs no longer experience a paging issue. For example, a UE within the subgroup of UEs may be paged halfway through the range of time instances (i.e. time window) to determine if the subgroup of UEs has returned to a geographical area where the subgroup of UEs no longer experience a paging issue.

In step 7 (first embodiment), the analytics producer may create a geographical map of the network region of interest based on the list of one or more geographical areas within the network region of interest where the group of UEs experience a paging issue and the environmental information of the network region of interest.

The analytics producer may send the result of the paging analytics to the analytics consumer. The result of the paging analytics may comprise the geographical map of the network region of interest. The result of the paging analytics may comprise the time when the subgroup of UEs return to a geographical area where the subgroup of UEs no longer experience a paging issue.

In step 8 (second embodiment), the analytics producer may send the result of the paging analytics to the analytics consumer. The result of the paging analytics may comprise the list of one or more geographical areas within the network region of interest where the group of UEs experience a paging issue. The result of the paging analytics may comprise the time when the subgroup (i.e. cluster) of UEs return to a geographical area where the subgroup of UEs no longer experience a paging issue.

In step 9 (second embodiment), the analytics consumer may create a geographical map of the network region of interest based on the list of one or more geographical areas within the network region of interest where the group of UEs experience a paging issue and environmental information of the network region of interest.

Subsequent to receiving or creating the geographical map of the network region of interest, the analytics consumer may determine whether a UE is likely to experience a paging issue based on a current location of the UE. If the current location of the UE falls within a geographical area of the list of one or more geographical areas within the network region of interest where the group of UEs experience a paging issue, the analytics consumer may determine that the UE is likely to experience a paging issue. The analytics consumer may abstain from sending a paging message to the UE.

The current location of the UE may be determined by an analytics producer for mobility. The current location of the UE may be determined by the analytics consumer. The current location of the UE may be determined based on location information) and/or mobility information (e.g. last mobility information).

Additionally or alternatively, subsequent to receiving the time when a subgroup of UEs return to a geographical area where the subgroup of UEs no longer experience a paging issue, the analytics may determine whether a UE is likely to no longer experience a paging issue based on a current time. If the current time falls within the time when a subgroup of UEs return to a geographical area where the subgroup of UEs no longer experience a paging issue, the analytics consumer may determine that the UE is likely to no longer experience a paging issue. The analytics consumer may send a paging message to the UE.

In step 10 (first option), the analytics consumer may send a request to an analytics producer for mobility to produce location analytics. Producing location analytics may include determining a current location of the UE.

In step 11 (first option), the analytics consumer may receive the result of the location analytics including the current location of the UE.

In step 12 (second option), the analytics consumer may collect location information (e.g., last location information) and/or mobility information (e.g. last mobility information). For example, the analytics may collect measurements from the UE over time including location information and/or mobility information. The analytics consumer may determine a current location of the UE.

In step 13, the analytics consumer may determine whether a UE is likely to experience a paging issue based on a current location of the UE and the geographical map of the network region of interest.

If the currently know location of the UE falls within a geographical area of the list of one or more geographical areas within the network region of interest where the group of UEs experience a paging issue, the analytics consumer may determine that the UE is likely to experience a paging issue. The analytics consumer may abstain from sending a paging message to the UE.

The analytics consumer may determine when a UE is likely to no longer experience a paging issue based on the received time when a subgroup of UEs return to a geographical area where the subgroup of user equipment no longer experience a paging issue and a current time. The analytics consumer may know that the UE is part of the subgroup of UEs and may know that the UE has similar time schedule information than the subgroup of UEs. The analytics consumer may not know whether the UE is part of the subgroup of UEs but may assume that the UE has similar time schedule information than the subgroup of UEs.

If the current time falls within the time when a subgroup of UEs return to a geographical area where the subgroup of UEs no longer experience a paging issue, the analytics consumer may determine that the UE is likely to no longer experience a paging issue. The analytics consumer may send a paging message to the UE.

The use case described above may be contributed to TS 28.104 in the section relative to paging optimization analysis. In addition, the following requirements may be contributed to TS 28.104 in the section relative to paging optimization analysis.

| Requirement label | Description | Related use case(s) |
|---|---|---|
| REQ-PAG_MDA-04 | MDA capability for paging optimization analysis shall be able to provide analytics output describing the predicted geographical location where UEs are out of coverage, | Paging Optimization Analysis (clause 7.2.1.3.3) |

-continued

| Requirement label | Description | Related use case(s) |
|---|---|---|
| REQ-PAG_MDA-05 | MDA capability for paging optimization analysis shall be able to provide analytics output to suggest the time schedule when UE out of coverage may return and be available to paged. | Paging Optimization Analysis (clause 7.2.1.3.3) |

Subsequent to the requirements being contributed, stage 2 contributions may involve enhancing the paging optimization data type by including the list of one or more geographical areas within the network region of interest where the group of UEs experience a paging issue and the time when a subgroup of UEs return to a geographical area where the subgroup of UEs no longer experience a paging issue.

FIG. 6 shows a signaling diagram of a method for providing paging analytics for a network region of interest to an analytics consumer performed by an analytics producer.

In step 600, an analytics producer may receive, from an analytics consumer, a request to produce paging analytics for a network region of interest, wherein producing the paging analytics include creating a list of one or more geographical areas within the network region of interest where a group of user equipment experience a paging issue.

In step 602, the analytics producer may produce paging analytics for the network region of interest.

In step 604, the analytics producer may send, to the analytics consumer, results of the paging analytics.

A geographical area may be defined by geographical coordinates. A geographical area may be defined by three dimensional geographical coordinates. A geographical area may be defined by an order to connect the geographical coordinates.

The analytics producer may identify the group of user equipment based on location information and/or mobility information.

The analytics producer may create a geographical map of the network region of interest based on the list of one or more geographical areas within the network region of interest where the group of user equipment experience a paging issue and environmental information of the network region of interest. The analytics producer may send, to the analytics consumer, results of the paging analytics including the geographical map of the network region of interest.

The analytics producer may send, to the analytics consumer, results of the paging analytics including the list of one or more geographical areas within the network region of interest where the group of user equipment experience a paging issue to allow the analytics consumer to create geographical map of the network region of interest based on the list of one or more geographical areas within the network region of interest where the group of user equipment experience a paging issue and environmental information of the network region of interest.

Environmental information of the network region of interest may comprise the presence of one or more buildings, vegetation or mountains. Environmental information of the network region of interest may comprise the presence of one or more propagation obstacles.

Producing paging analytics may include identifying a time when a subgroup of user equipment return to a geographical area where the subgroup of user equipment no longer experience a paging issue.

The analytics producer may identify the subgroup of user equipment based on time schedule information.

The time when a subgroup of user equipment return to a geographical area where the subgroup of user equipment no longer experience a paging issue may be identified based on the time schedule information.

The analytics producer may send, to a management service or a data collection entity, a request to receive data to produce paging analytics for the network region of interest. The analytics producer may receive, from the management service or the data collection entity, data to produce paging analytics for the network region of interest. The analytics producer may use the data to produce paging analytics for the network region of interest.

The data may comprise cellular network data and/or non-cellular network data.

Cellular network data may comprise paging information and/or location information. Non-cellular network data may comprise a road map of the region of interest and/or camera images of places in the region of interest.

FIG. 7 shows a signaling diagram of a method for providing paging analytics for a network region of interest to an analytics consumer performed by the analytics consumer.

In step 700, an analytics consumer may send, to an analytics producer, a request to produce paging analytics for a network region of interest, wherein producing paging analytics include creating a list of one or more geographical areas within the network region of interest where a group of user equipment experience a paging issue.

In step 702, the analytics consumer may receive, from the analytics producer, results of the paging analytics.

The group of user equipment may be identified based on last location information and/or mobility information prior to experiencing a paging issue.

The analytics consumer may receive, from the analytics producer, results of the paging analytics including a geographical map of the network region of interest based on the list of one or more geographical areas within the network region of interest where the group of user equipment experience a paging issue and environmental information of the network region of interest.

The analytics consumer may receive, from the analytics producer, results of the paging analytics including the list of one or more geographical areas within the network region of interest where the group of user equipment experience a paging issue. The analytics consumer may create a geographical map of the network region of interest based on the list of one or more geographical areas within the network region of interest where the group of user equipment experience a paging issue and environmental information of the network region of interest.

Producing paging analytics may include identifying a time when a subgroup of user equipment return to a geographical area where the subgroup of user equipment no longer experience a paging issue.

The subgroup of user equipment may be identified based on time schedule information.

The time when a subgroup of user equipment return to a geographical area where the subgroup of user equipment no longer experience a paging issue may be identified based on the time schedule information.

Figure 8:
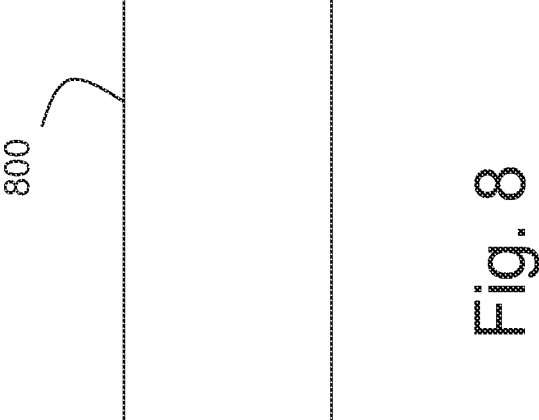
FIG. 8 shows a schematic representation of a non-volatile memory medium storing instructions which when executed by a processor allow a processor to perform one or more of the steps of the methods of FIGS. 7 and 8.

The analytics consumer may obtain current location information of a user equipment. The analytics consumer may use the current location information of the user equipment and the result of the analytics to predict whether the user equipment is likely to experience a paging issue FIG. 8 shows a schematic representation of non-volatile memory media 8000 (e.g., storing instructions and/or parameters which when executed by a processor allow the processor to perform one or more of the steps of the methods of FIGS. 7 and 8.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 7 and 8, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

We claim:

1. An apparatus comprising:

at least one processor; and at least one memory storing instructions of an analytics producer of a network, wherein the instructions, when executed by the at least one processor, cause the apparatus to perform at least:

receiving, from an analytics consumer of the network, a request to produce paging analytics for a region of interest of the network, the request comprising an indication of the region of interest of the network;

producing the paging analytics for the region of interest of the network based on the indication of the region of interest of the network, the producing comprising:

generating a geographical map of the region of interest of the network, the geographical map comprising one or more geographical areas within the region of interest of the network where a group of user equipment experienced a paging issue; and sending, to the analytics consumer, the paging analytics, the paging analytics comprising the geographical map of the region of interest of the network.

2. The apparatus of claim 1, wherein the instructions, when executed by the at least one processor, further cause the apparatus to perform at least:

identifying the group of user equipment based on at least one of location information of user equipment or mobility information for user equipment.

3. The apparatus of claim 1, wherein the producing the paging analytics further comprises identifying a time when one or more user equipment of the group of user equipment return to a geographical area where the one or more user equipment of the group of user equipment no longer experienced a paging issue.

4. The apparatus of claim 3, wherein the identifying comprises:

identifying the time when the one or more user equipment of the group of user equipment return to the geographical area where the one or more user equipment of the group no longer experienced the paging issue based on time schedule information.

5. The apparatus of claim 1, wherein the instructions when executed by the at least one processor, further cause the apparatus to perform at least:

sending, to a management service or a data collection entity, a request to receive data to produce the paging analytics for the region of interest of the network;

receiving, from the management service or the data collection entity, data to produce the paging analytics for the region of interest; and wherein the producing the paging analytics comprises generating the geographical map using the data.

6. The apparatus of claim 5, wherein the data comprises at least one of cellular network data or non-cellular network data.

7. An apparatus comprising:

at least one processor; and at least one memory storing instructions of an analytics consumer of a network, wherein the instructions, when executed by the at least one processor, cause the apparatus at least to perform:

sending, to an analytics producer, a request to produce paging analytics, the request comprising an indication of a region of interest of the network; and receiving, from the analytics producer, the paging analytics, the paging analytics comprising a geographical map of the region of interest of the network, the geographical map including one or more geographical areas of the region of interest in which a group of user equipment experienced a paging issue;

obtaining a location of a user equipment of the group of use equipment;

predicting whether the user equipment is likely to experience a paging issue using the location of the user equipment and the paging analytics.

8. The apparatus of claim 7, wherein the paging analytics further comprise a time when one or more user equipment of the group of user equipment return to a geographical area in which the one or more user equipment of the group of user equipment no longer experienced a paging issue.

9. A method comprising:

receiving, by an analytics producer of a network, from an analytics consumer of the network, a request to produce paging analytics, the request comprising an indication of a region of interest of the network for which the paging analytics are to be produced;

producing, by the analytics producer, the paging analytics for the region of interest of the network, the producing comprising:

generating by the analytics producer, a geographical map of the region of interest of the network, the geographical map comprising one or more geographical areas within the region of interest of the network where a group of user equipment experienced a paging issue; and sending, by the analytics producer to the analytics consumer, the paging analytics, the the paging analytics comprising the geographical map of the region of interest of the network.

10. The method of claim 9, further comprising:

identifying, by the analytics producer, the group of user equipment based on at least one of location information of user equipment or mobility information for user equipment.

11. The apparatus of claim 9, wherein the producing the paging analytics includes identifying, by the analytics producer, a time when one or more user equipment the group of user equipment return to a geographical area where the the one or more user equipment of the group of user equipment no longer experienced a paging issue.

12. The apparatus of claim 11, wherein the identifying comprises:

identifying the time the one or more user equipment of the group of user equipment return to the geographical area where the one or more user equipment of user equipment no longer experienced the paging issue based on time schedule information.

13. The apparatus of claim 9, further comprising:

sending, by the analytics producer to a management service or a data collection entity, a request to receive data to produce the paging analytics for the region of interest;

receiving, by the analytics producer from the management service or the data collection entity, data to produce the paging analytics for the region of interest; and wherein the producing, by the analytics producer, the paging analytics comprises generating by the analytics producer, the geographical map using the data.

14. The apparatus of claim 13, wherein the data comprises at least one of cellular network data or non-cellular network data.

* * * * *